US009868513B2

(12) United States Patent
Sandri (10) Patent No.: US 9,868,513 B2
(45) Date of Patent: Jan. 16, 2018

(54) DEVICE FOR WARNING A ROTORCRAFT PILOT BY MEANS OF TACTILE SIGNALS AND MAKING USE OF A TRIM ACTUATOR CONNECTED TO A FLIGHT CONTROL MEMBER

(71) Applicant: AIRBUS HELICOPTERS, Marignane (FR)

(72) Inventor: Florence Sandri, Meyrargues (FR)

(73) Assignee: AIRBUS HELICOPTERS, Marignane (FR)

( * ) Notice: Subject to any disclaimer, the term of this patent is extended or adjusted under 35 U.S.C. 154(b) by 590 days.

(21) Appl. No.: 14/723,537

(22) Filed: May 28, 2015

(65) Prior Publication Data

US 2015/0344128 A1 Dec. 3, 2015

(30) Foreign Application Priority Data

May 28, 2014 (FR) ..................................... 14 01235

(51) Int. Cl.
| | |
|---|---|
| *B64C 13/10* | (2006.01) |
| *B64C 13/18* | (2006.01) |
| *B64C 13/46* | (2006.01) |
| *B64C 27/56* | (2006.01) |
| *G08B 6/00* | (2006.01) |

(52) U.S. Cl.
CPC .............. *B64C 13/10* (2013.01); *B64C 13/18* (2013.01); *B64C 13/46* (2013.01); *B64C 27/56* (2013.01); *G08B 6/00* (2013.01)

(58) Field of Classification Search
CPC ......... B64C 27/56; B64C 27/57; B64C 13/08; B64C 13/10; B64C 13/16; B64C 13/18; B64C 13/22; B64C 13/44; B64C 13/46
See application file for complete search history.

(56) References Cited

U.S. PATENT DOCUMENTS

| | | | | |
|---|---|---|---|---|
| 4,106,728 A | * | 8/1978 | Griffith ................... | B64C 13/46 244/221 |
| 6,695,264 B2 | * | 2/2004 | Schaeffer ................ | B64C 13/10 244/12.4 |

(Continued)

FOREIGN PATENT DOCUMENTS

EP 2631172 8/2013

OTHER PUBLICATIONS

French Search Report for French Application No. 1401235, Completed by the French Patent Office on Jan. 23, 2015, 8 Pages.

*Primary Examiner* — Richard R Green
(74) *Attorney, Agent, or Firm* — Brooks Kushman P.C.

(57) ABSTRACT

A method of using a tactile signal warning device forming part of a human-operated flight control member of a rotorcraft. The warning device makes use of an anchorable motorized trim actuator for generating a resisting force against movement of the flight control member. The warning device comprises a warning unit that, as a function of a power margin (MP1) calculated by a predictor unit in compliance with a current regulation rating of the power plant and on condition that state data indicates that an autopilot is activated in a higher operating mode, acts to generate an order to activate the trim actuator depending on the conditions under which the flight control member is being moved as identified by a force management unit.

20 Claims, 4 Drawing Sheets

(56) References Cited

U.S. PATENT DOCUMENTS

| | | | |
|---|---|---|---|
| 6,735,500 B2 * | 5/2004 | Nicholas | B64C 27/56 244/17.13 |
| 7,098,811 B2 * | 8/2006 | Augustin | B64C 27/56 244/223 |
| 7,262,712 B2 | 8/2007 | Greene | |
| 8,594,864 B2 * | 11/2013 | Greenfield | B64D 31/04 244/175 |
| 2005/0004721 A1 | 1/2005 | Einthoven et al. | |
| 2006/0071817 A1 | 4/2006 | Greene | |
| 2010/0123045 A1 | 5/2010 | Grieser | |

* cited by examiner fig. 1 fig.2 fig.3 fig.4 fig.5 fig.6 fig.7

DEVICE FOR WARNING A ROTORCRAFT PILOT BY MEANS OF TACTILE SIGNALS AND MAKING USE OF A TRIM ACTUATOR CONNECTED TO A FLIGHT CONTROL MEMBER

CROSS REFERENCE TO RELATED APPLICATION

This application claims priority to French patent application No. FR 14 01235 filed on May 28, 2014, the disclosure of which is incorporated in its entirety by reference herein.

BACKGROUND OF THE INVENTION (1) Field of the Invention

The present invention relates to the field of flight control systems for rotorcraft that modify the pitch of the blades of a main rotor serving to provide the rotorcraft at least with lift. The present invention relates more particularly to such flight control systems including a tactile signal warning device for warning a rotorcraft pilot that a demand has been made for excessive mechanical power to be supplied by a power plant of the rotorcraft for driving at least the main rotor.

(2) Description of Related Art

It should be recalled that rotorcraft are rotary wing aircraft in which at least lift is provided by at least one main rotor having a drive axis that is substantially vertical. In the specific context of a helicopter, the main rotor provides the rotorcraft not only with lift, but also with propulsion in any travel direction.

Rotorcraft are also commonly provided with an antitorque device serving to guide them in yaw, such as at least one auxiliary rotor having a drive axis that is substantially horizontal. By way of example, such an auxiliary rotor is a tail rotor, or in the context of a high-speed helicopter having forward propulsion, it may be formed by a propulsive propeller.

The rotor(s) of the rotorcraft is/are driven in rotation by a power plant. The behavior in flight of the rotorcraft can be modified by a pilot of the rotorcraft causing the pitch of the blades making up the rotary wing of the rotor(s) to vary cyclically and/or collectively. More particularly, the pilot causes the blades to move about respective pitch variation axes extending in the main direction in which each blade extends.

The pilot of the rotorcraft may potentially be a human pilot generating manual flight commands and/or an autopilot generating automatic flight commands.

With reference more particularly to the main rotor, varying the blade pitch cyclically changes the attitude behavior of the rotorcraft, and more particularly selectively changes its behavior in pitching and/or in roll. Varying the pitch of the blades collectively leads to a change in the lift force supplied by the main rotor of the rotorcraft and/or enables the rotorcraft to be guided along the gravity axis.

In order to generate flight commands manually for varying the pitch of the blades of the main rotor, a human pilot makes use of main control linkages that are operated manually (as opposed to automatically) by the pilot moving flight control members. The main control linkages can pivot the blades about their respective pitch variation axes by means of a mechanism involving swashplates mounted both to move axially and to rock on a mast carrying the rotor. The swashplates comprise a top swashplate connected to the blades via pitch control rods and mounted to rotate on a bottom swashplate that is connected to the main control linkages.

Conventionally, in order to vary the collective pitch of the blades of the main rotor, the flight control member is typically arranged as a pitch lever for actuating a first main control linkage to cause the swashplates to move axially. In order to cause the blades of the main rotor to vary cyclically, the flight control member is typically arranged as a stick for actuating a second main control linkage for tilting the swashplates.

In general, the main control linkages make use of hydraulic servo-controls that drive the blades of the main rotor about their pitch variation axes on the basis of flight commands generated by the human pilot acting on the flight control members. The use of such servo-controls enables the pilot to pivot the blades of the main rotor about their respective pitch variation axes accurately and without requiring a large amount of force.

Nevertheless, it should be observed that in spite of the assistance provided by the servo-controls in driving pitch changes of the blades, the human pilot must still apply drive forces to the flight control member that are sufficient to overcome any friction of greater or lesser extent that persists among the various members making up the mechanical transmission constituting the main control linkage.

In other embodiments, the main control linkage may also include transmission that is both mechanical in part and also optical or electrical in part.

Under such circumstances, the movements of the flight control member may be detected by an optical or electrical sensor generating a signal representative of the current position of the control member. Such a signal is then transmitted to a computer suitable for generating control signals for hydraulic servo-controls that drive the blades of the main rotor about their respective pitch variation axes.

Such a flight control member may then advantageously be in the conventional form of pedals, a stick, or a lever of large operating travel, i.e. for example a free end of the control member can move through a distance that is considerable, being several tens of centimeters.

In another embodiment, it is also possible for the control member to be in the form of a miniature stick, also known as a "joystick". Such a joystick then moves through small distances. More precisely, the free end of a joystick can move through an amplitude that is limited to a few centimeters.

In order to generate flight commands automatically, the rotorcraft has auxiliary control linkages making use of an autopilot, with one auxiliary control linkage being associated with each of the travel axes of the rotorcraft.

In a simplified arrangement of said auxiliary control linkages, the autopilot is used at least in certain modes of operation, commonly referred to as "basic modes", to provide assistance in stabilizing travel of the rotorcraft respectively at least in pitching, in roll, and in yaw. In an improved arrangement of said auxiliary control linkages, the autopilot is also used in operating modes, commonly referred to as "higher modes", and serving respectively to guide the rotorcraft along its various travel axes in pitching, in roll, in yaw, and along the gravity axis.

Depending on the equipment of the rotorcraft, the autopilot may be capable of performing at least said basic functional mode and possibly also the higher mode.

In order to cause the pitch of the blades of the main rotor to vary, the autopilot generates activation orders for actuators engaged on a given main control linkage. Such actuators commonly comprise an actuator known as the "trim actuator", and an actuator commonly known as the "series actuator".

For a given main control linkage, the trim actuator is typically connected to the flight control member in parallel with the main control linkage. The trim actuator is dedicated to moving the main control linkage with movements that may be considerable.

In a common embodiment, the trim actuator is commonly used to transmit a sensation of force to the pilot in response to the pilot causing the blades to pivot by acting on the flight control member. For this purpose, the trim actuator incorporates a force return system that generates a resisting force against a human moving the flight control member, which force depends on the current pivot position of the blades about their respective pitch variation axes.

The force return system commonly uses at least one trim actuator motor, or indeed a clutch mechanism and optionally resilient deformation means, e.g. organized as a spring. On being activated, the force return system causes the trim actuator to be anchored to the main control linkage, thus enabling the trim actuator to generate said resisting force against a human moving the flight control member.

The trim actuator is anchored to the main control linkage, in particular by means of a clutch mechanism serving selectively either to anchor the trim actuator to the main control linkage in a clutched position, or else to release the main control linkage from the engagement exerted by the trim actuator, when in a declutched position.

The human pilot commonly has available a function for inhibiting the operation of the force return system, known as a "trim release", in order to release the trim actuator from being anchored to the main control linkage.

The trim actuator is anchored to the main control linkage in particular by activating the motor and/or, where appropriate, by using the clutch mechanism. When the trim actuator is in the anchored situation, rotation of the motor is caused to depend on identifying those flight commands that are issued by the human pilot via the flight control member so as to vary said resisting force, either directly, or where appropriate, by acting via the resilient deformation means.

Under such conditions, it is possible to distinguish between various types of trim actuator that are commonly classified depending on their structure and the ways in which they operate, in particular for the purpose of generating said resisting force.

In particular, the following types of trim actuator are known among others:

motorized friction trim actuators of passive type providing a resisting force that is constant and independent of the position of the flight control member; and anchorable motorized trim actuators providing a variable resisting force against the main control linkage being moved by a human acting on the flight control member.

The resisting force opposed by an anchorable motorized trim actuator varies under the effect of activating the motor of the trim actuator. Activating said motor of the trim actuator makes it possible to vary the force gradient opposed by the trim actuator against human movement of the flight control member. The force gradient opposed by the trim actuator is determined in particular depending on the relative position between the anchoring position of the trim actuator on the main control linkage and the current position of the flight control member.

Furthermore, among anchorable motorized trim actuators, it is possible to distinguish between anchorable motorized trim actuators of passive type and anchorable motorized trim actuators of active type, depending on the ways used for generating said resisting force.

For an anchorable motorized trim actuator of passive type, said resisting force is produced via a prestressed spring that is placed under greater or lesser tension by activating the motor. The prestress of the spring provides piloting comfort by compensating for friction in the main control linkage.

With an anchorable motorized trim actuator of active type, said resisting force is produced directly by the motor of the trim actuator that opposes a resisting torque against the main control linkage being moved. The motor of the trim actuator also serves to provide said piloting comfort by compensating for the friction in the main control linkage by generating a resisting torque of given value.

The series actuator is typically placed in series in the main control linkage, being dedicated to moving the main control linkage with movements that are smaller and faster than those generated by the trim actuator.

Furthermore, the power plant of the rotorcraft has one or more fuel-burning engines, in particular turboshaft engines. The current operating rating of the power plant depends on a regulator unit applying various different regulation ratings that are identified relative to a nominal regulation rating, commonly referred to as the "all engines operable" (AEO) rating.

Regulating the operating rating of the power plant serves to avoid the engine(s) being degraded under the effect of excessive use being made of the capability of the power plant to supply the mechanical power required by the rotorcraft. Several limit criteria are taken into account by the regulation rating in order to avoid such excessive use.

Among such limit criteria, mention may be made in particular of the following:

a limit criterion concerning the temperature of the gas leaving the high pressure turbine of the turboshaft engine(s);

a limit criterion on the speed of the gas generator and/or of the free turbine driven by the gas leaving the high pressure turbine; and a limit criterion on the torque as admitted to a main power transmission gearbox with which the rotor(s) is/are engaged in order to be driven.

In addition to the AEO rating, various specific operating ratings for the power plant are usually defined relative to stages of flight of the rotorcraft.

Among these specific regulation ratings within the AEO rating, mention may be made in particular of the following:

a maximum continuous power (MCP) rating defining the maximum power authorized for continuous use of the engine(s) in order to comply with the constraints imposed by said limit criteria;

a maximum takeoff power (TOP) rating defining the maximum power that is authorized for use of the engine(s) over a predefined duration that is defined to be sufficient to enable the rotorcraft to take off; and a maximum transitional power (MTP) rating defining the maximum power that is authorized for use of the engine(s) during a transitional stage of changing the travel speed of the rotorcraft, in particular while the rotorcraft is accelerating.

Under such conditions, in the field of aviation, it is necessary to take account of the possibility of one of the engines of a power plant of a motor-driven aircraft failing. In the event of such a failure, the number of engines available for supplying the rotorcraft with the necessary mechanical power is reduced.

That is why one engine inoperative (OEI) ratings have been established for regulating the engines of a power plant in the event of one of them failing. In the event of one engine failing, at least one other available engine operating in OEI rating is capable of delivering the mechanical power needed for operating the rotorcraft during a predefined duration so as to enable the rotorcraft to continue flying temporarily in spite of one of its engines being unavailable.

Various OEI ratings are commonly established for various stages of flight of the rotorcraft, such as for example the following common OEI ratings:

a very short duration OEI (VSD-OEI) rating during which the still-operational engine(s) is/are capable individually of being used at a contingency rating for a short duration of the order of 30 seconds while the rotorcraft is taking off;

a short duration OEI (SD-OEI) rating during which the still-operational engine(s) is/are individually capable of being used at a contingency rating for a short duration of the order of 2 minutes to 3 minutes during an advanced stage of takeoff of the rotorcraft; and a long-duration or continuous OEI (C-OEI) rating, during which the still-operational engine(s) is/are individually capable of being used at a maximum power for a duration that is long, and potentially unlimited.

The unit for regulating the operation of the power plant, such as for example a full authority digital engine control (FADEC) has a regulation command that is delivered by a control unit of the rotorcraft, such as for example an automatic flight control system (AFCS).

In this context, there arises the general problem of the human pilot of the rotorcraft monitoring potential excessive use of the capabilities of the power plant for supplying the mechanical power required by the rotorcraft.

It is known to monitor the mechanical power margins available from the power plant by using display means, on the basis of data provided by a first limitation instrument (FLI).

The values of margins that are available using various different limit criteria are collected by the FLI, and the most constricting margin compared with the various operating ratings authorized for the power plant is taken into account when displaying the available power margin and/or, in equivalent manner, the margin available for varying the pitch of the blades of the main rotor.

Nevertheless, it is useful to reduce the workload on a human pilot, whose attention is essentially occupied by monitoring the environment outside the rotorcraft. That is why warning devices have been developed that generate at least one tactile signal that can be perceived by the human pilot via a flight control member.

Such warning devices serve to warn the human pilot of a situation that is potentially dangerous with respect to making excessive use of the capabilities of the power plant for supplying the mechanical power required by the rotorcraft.

It is appropriate to obtain warning information for transmission to the pilot in tactile manner that is variable depending on the degree of urgency with which the pilot needs to take action to reduce the mechanical power needs that the power plant must supply.

It is also appropriate to optimize reasonably the extent to which parameters are taken into account that could reveal excessive use of the capabilities of the power plant for supplying the mechanical power required by the rotorcraft.

It is also appropriate to ensure that the techniques used by such warning devices do not give rise to any risk of generating sudden changes to the operating speed of the power plant.

By way of example, proposals have been made by the Applicant in a Document US 2010/123045, or as described in Documents U.S. Pat. No. 7,098,811 and EP 2 631 172 (Bell Helicopter Textron, Inc.), and U.S. Pat. No. 7,262,712 and US 2006/071817 (Safe Flight Instrument, Corp.), or indeed in US 2005/004721 (Einthoven, Pieter G.) to provide a tactile signal warning device on a pitch lever dedicated to manually controlling collective variation in the pitch of the blades of a main rotor of a rotorcraft in order to inform the pilot of an overload state of the engine(s) of the rotorcraft.

For that purpose, the respective values of various flight parameters of the rotorcraft are collected and are transmitted to a calculation unit that determines a current or an anticipated overload state of the engines of the power plant. In the event of there being such an overload state, the calculation unit causes the warning device to be activated in manners that vary depending on the degree with which the pilot needs to act in order to reduce the demand for power.

In order to determine the overload state of the engine(s), the flight parameters of the rotorcraft that are taken into consideration are selected from those that conventionally reveal the operating state of the engine(s), such as the flight parameters commonly used for characterizing the above-mentioned limit criteria in the context of regulating the engine(s).

According to Document U.S. Pat. No. 7,098,811, the warning device is made up of firstly of a shaker, and secondly of a spring cartridge engaged on the pitch lever and constrained by an electric motor that is used under the control of the calculation unit.

At a first emergency threshold, the calculation unit activates the electric motor by switching on the spring cartridge to generate a resisting force against the pilot moving the pitch lever. At a second emergency threshold, the calculation unit activates the shaker.

Said emergency thresholds are determined as a function of the values of various flight parameters of the rotorcraft as supplied by a health and usage monitoring system (HUMS).

Under the effect of being switched on, the spring cartridge is rated to an anchoring value that is regulated by the electric motor. The anchoring value is calculated iteratively depending on the current values of said flight parameters by varying flight conditions of the rotorcraft in accordance with an anticipated value for the mechanical power to be delivered by the power plant as calculated iteratively by a predicted algorithm depending on the values of the flight parameters transmitted by the HUMS and/or by a control unit.

According to Document U.S. Pat. No. 7,262,712, the warning device is constituted by a shaker that generates shaking of amplitude and frequency that vary depending on variation in the urgency with which the pilot needs to act on the behavior of the rotorcraft. The urgency with which the pilot needs to act is determined by the calculation unit depending on the values of various flight parameters supplied by the on-board instrumentation of the rotorcraft, such as values for the temperature of gas at the outlet from the high pressure turbine of the engines and values of the torque or the speed developed by the engine(s) depending on the flight stages of the rotorcraft.

In addition, and as described in Document EP 2 631 172, there is also known a method of using a device providing warning by means of tactile signals and fitted to a flight control member of a rotorcraft. Such a warning device thus comprises in particular:

a warning member comprising a trim actuator, the warning member generating a tactile sensation that can be perceived by the pilot via the control member;

a flight control unit serving to identify command data relating to the pilot requesting lift to be supplied by the main rotor, which data is deduced as a function of position data supplied to the control unit by a position sensor; and a predictor unit that acts iteratively at a certain frequency to calculate a power margin relating to the power available from the engine by taking the difference between a predicted power and a power limit relating to the power to be supplied by the engine as a function of its current operating speed.

Nevertheless, the structure and the operating conditions for such warning devices acting by means of tactile signals are not fully satisfactory in the context of the general operating constraints of a rotorcraft, which are becoming more and more complex.

Such constraints relate in particular to how the various flight control linkages are organized for generating and transmitting flight commands seeking to move the blades of the rotor(s) of the rotorcraft about their respective pitch variation axes, with this applying in particular to the main rotor.

BRIEF SUMMARY OF THE INVENTION

The object of the present invention is to propose ways of generating and transmitting a warning to a human pilot of a rotorcraft by means of tactile signals relating to an excessive demand for mechanical power to be supplied by a power plant of the rotorcraft.

More particularly, the present invention seeks to propose a method of implementing a tactile signal warning device fitted to a human-operated flight control member of a rotorcraft.

Said flight control member is more particularly dedicated to a human pilot varying the pitch of the blades of a main rotor of the rotorcraft, which may equally well be varied collectively or cyclically, by acting via a said main flight control linkage.

Furthermore, such a flight control member forms part of the main flight control linkage. It may thus be of mechanical type, in which case it then gives rise directly to the movement of at least one servo-control.

As mentioned above, the flight control member may also have detector means of optical or electrical type delivering a signal representative of the current position of the flight control member. Such an optical or electrical signal is then transmitted to a computer that serves to generate a control signal for a servo-control in the main flight control linkage, which flight control linkage is then partially mechanical and partially electrical or optical.

The approach of the present invention relates to ways of using such a device for providing warning by tactile signals, enabling a trim actuator connected to said flight control member to be used for supplying the pilot with warnings by means of tactile signals relating to potential excessive use of the capabilities of the power plant for supplying the mechanical power required by the rotorcraft.

In the context of such an approach, the method of the present invention needs to be incorporated in the complex environment for regulating and controlling the operation of various members of the rotorcraft. It is desirable for the method of the present invention to be suitable for being implemented with little or no modification to the general architecture of the organization of the means that provide such regulation and control of the overall operation of the rotorcraft.

In the context of such an approach, it is also desirable for the means used for providing the pilot with tactile signals via the trim actuator to be suitable for being used to activate a shaker forming part of the flight control member in addition to the warnings made by tactile signals supplied to the pilot by means of the trim actuator.

In this context, it is appropriate for the human pilot of the rotorcraft, who has little time to react in the event of a warning, to be in a position to distinguish quickly between the causes of warnings issued by tactile signals so as to enable the pilot to take action as quickly as possible and in the best possible way on the flight attitude of the rotorcraft.

Still with such an approach, it is also desirable for the tactile signal(s) generated by the warning system to be interrupted immediately in the event of a cause that has led to the tactile signal(s) being generated coming to an end as a result of action taken by the pilot. It is desirable to relieve the pilot as well as possible from any work overload in an emergency situation and in particular to limit the potential number of warnings that might be transmitted simultaneously to the human pilot by various members of the rotorcraft potentially identifying a variety of specific causes for warnings.

The method of the present invention is a method of implementing a tactile signal warning device fitted to a human-operated flight control member of a rotorcraft.

Said flight control member forms part of a main control linkage for varying the pitch of blades of at least one main rotor of the rotorcraft and providing the rotorcraft essentially with its lift.

The rotorcraft has a power plant providing mechanical power used at least for driving rotation of the main rotor.

The rotorcraft also has at least one auxiliary control linkage including an autopilot for generating flight control orders. Such an autopilot controls the use of at least one anchorable motorized trim actuator arranged in parallel with said main control linkage.

The rotorcraft may possibly have a force return device making use of the trim actuator to generate a resisting force against drive by the human acting on the flight control member.

Said resisting force is the result of the force return device responding to the flight commands issued by the human pilot of the rotorcraft. Said resisting force varies depending on how the motor of the trim actuator is activated by the force return device to vary the anchoring position of the trim actuator on the main flight control linkage.

It should be understood that the organization of the force return device typically seeks to impart a force sensation to the human pilot by means of the tactile signal that is proportional to the flight commands issued by the pilot so as to enable the pilot to feel the resisting torque opposed by the main rotor against being driven by the power plant of the rotorcraft.

Nevertheless, it should naturally be understood that although it is preferable for the rotorcraft to have such a force return device, this is a subsidiary matter and independent of the operation and use of the warning device in accordance with the method proposed by the present invention.

The rotorcraft is also provided with a predictor unit for acting iteratively at a given frequency to calculate at least one power margin depending on the current regulation rating of the power plant.

More particularly, this power margin relates to the power available from the power plant and is calculated by the predictor unit taking the difference between a predicted power and a predefined power limit relating to power to be supplied by the power plant, depending on the current regulation rating of the power plant.

In this context of rotorcraft operation, and in particular of the trim actuator being under the control of the autopilot, the method of the present invention is mainly recognizable in that the warning device comprises a first calculation member, referred to as a "warning unit", a second calculation member formed by said predictor unit, a third calculation member, referred to as a "force management" unit, and at least one warning member for generating a tactile sensation perceptible by the human pilot by means of the flight control member.

Said at least one warning member comprises at least said trim actuator opposing a resisting force against the flight control member being moved by a human.

In compliance with selecting such a structural organization for the warning device, one difficulty to be overcome lies in the ways of using the trim actuator in the context of generating a tactile warning that depends on the available power margin that can be supplied by the power plant, depending on its current regulation rating, in order to drive the main rotor.

Said difficulty lies in particular in the need to select a method of using the trim actuator that makes it possible to generate such a progressive tactile warning while taking various constraints into account. Such constraints are associated in particular with:

the pertinence of the trim actuator being used in the context of it possibly being used in some other way by other devices of the rotorcraft, such as in particular the autopilot, generating flight control orders that activate the trim actuator in order to stabilize and/or guide the rotorcraft in flight. A change to the anchoring position of the trim actuator seeking to produce a tactile warning must fit in the overall environment of the use being made of the trim actuator on board the rotorcraft in flight;

the pertinence of the tactile warnings that are generated depending on the urgency with which the pilot needs to act on the flying behavior of the rotorcraft in the context of processing a large amount of complex information in reliable and pertinent manner that needs to be taken into account in order to make appropriate use of at least the trim actuator, and preferably also of the shaker. Choices need to be made in collecting and processing such available information not only for generating said tactile warnings but also for coordinating the various potential uses that may be made of the trim actuator by other devices of the rotorcraft;

the constraint of using an anchorable motorized trim actuator, preferably one of active type, i.e. producing a resisting force by means of a resisting torque opposed by its motor, with the force gradient of said resisting torque varying depending on the anchoring position of the trim actuator in the absence of a prestressed spring, as for an anchorable motorized trim actuator of passive type;

the constraint of using the warning device while preserving piloting comfort and avoiding any increase in the nervous tension of the pilot who is being subjected to an emergency situation. In particular, it is necessary to avoid sustained and untimely generation of tactile signals by the warning device. It is desirable for the generation of tactile signals to be graduated in ways that are clearly and quickly identifiable by the pilot depending on the cause for urgent action to be taken on the behavior of the rotorcraft. It is also desirable for the tactile signals that are generated to be interrupted as soon as the causes that have led to the tactile signals being generated have been eliminated; and with respect to piloting comfort and to the pertinence of the collected information about the reactions of the pilot in an emergency situation for re-establishing safe flight of the rotorcraft, the constraint of taking account of any friction conventionally to be found in the mechanical transmission linkages used for varying the pitch of the blades of a rotorcraft rotor.

Naturally, the above list of difficulties to be overcome is not exhaustive and other technical results, advantages, and uses procured by the present invention appear implicitly or explicitly on reading the following description.

In the method of the present invention, a first choice is made independently of the specific structure of the anchorable motorized trim actuator to use members that are suitable for supplying the warning unit with control data supplied by the force management unit.

More particularly, the force management unit generates command data relating to a human-originating request for lift to be supplied by the main rotor. Such command data is a function of position data and/or of force data.

The position data is supplied to the force management unit by a position sensor measuring a current position of the flight control member.

The force data is supplied to the force management unit by a force measurement device engaged on said main control linkage, e.g. comprising a force link engaged with the flight control member. Said force data is thus representative of the forces moving the main control linkage under the effect of a human acting on the flight control member while the trim actuator is held anchored to the main control linkage. Thus, such a trim actuator is arranged in a predefined anchoring position so as to generate a resisting force against the movement of the main control linkage. Such a force may then be constant or else it may be variable in application of a predetermined force relationship.

Still in the method of the present invention, a second choice is made that the predictor unit begins by calculating said predicted power by summing a current power of the power plant and a power variation to be supplied by the power plant as requested under the effect of a human moving the flight control member. More particularly, it is proposed that the predictor unit deduces said requested power variation depending on command data that is a function at least of the position data.

Still in the method of the invention, a third choice is made to use the warning unit to collect at least one of the data items selected from the group comprising:

the command data as a function of at least one of the position data supplied by the position sensor and the force data supplied by the force measurement device;

at least a first said power margin supplied by the predictor unit by taking the difference between said predicted power and a first said power limit; and state data relating to activation of at least any higher operating mode of the autopilot causing the main control linkage conventionally serving to guide the rotorcraft relative to at least one travel axis typically associated with a higher operating mode of the autopilot, such as in particular respectively at least along the gravity axis, and possibly also in pitching and in roll.

In accordance with such choices, it is proposed to use the warning unit to generate an anchoring command for anchoring the trim actuator on the main control linkage. Said anchoring command is generated under the combined conditions of said first power margin and of the command data comprising equally well position data and/or force data relating to a request to increase the lift to be supplied by the main rotor.

As a result of the warning unit generating said command for anchoring the trim actuator, the predictor unit regulates activation of the motor of the trim actuator and thus regulates an anchoring position of the trim actuator on the main control linkage, thereby varying the resisting force opposed by the trim actuator against the human-driven movement of the flight control member.

In accordance with the approach of the present invention, it is essential to take account of conditions for interrupting the command for anchoring the trim actuator by the warning unit depending on the reactions of the pilot, while keeping available potential for alternative use of the trim actuator by other devices forming part of the rotorcraft.

Furthermore, it is desired that the way in which the trim actuator anchor command is interrupted and the way in which the resisting force is varied as a result should make the following choices possible:

anticipating provisions that might be taken in subsidiary manner to avoid the pilot possibly feeling discomfort because of the main control linkage being released from the anchoring of the trim actuator as a result of the warning unit interrupting the command for anchoring the trim actuator; and enabling the human pilot of the rotorcraft to let go the flight control member and consequently interrupt human-generated movement thereof, but without that interrupting the potential for the warning unit to generate tactile signals.

In this context, the warning unit ceases to generate the command for anchoring the trim actuator when the force management unit generates command data representative of a human request to reduce the lift to be supplied by the main rotor, the human exerting a drive force on the flight control member that opposes a resisting force of the trim actuator.

Preferably, the method further comprises an operation of the warning unit comparing the value of the first margin and a first power threshold defined in compliance with the current regulation rating. The warning unit ceases to generate the command for anchoring the trim actuator when the following conditions are satisfied:

the force management unit generates command data relating to position data identifying that the flight control member is not being operated by a human; and the warning unit identifies a value for the first power margin that is greater than or equal to said first power threshold.

In various possible variants of the invention, the predictor unit regulates said activation of the motor of said trim actuator as a function of variation in the value equally well of the position data and/or of the force data, and/or as a function of variation in the first power margin.

After the warning unit has generated the anchoring command, anchoring data relating to the current anchoring position of the trim actuator on the main control linkage is preferably supplied by the warning unit, at least to the autopilot, and indeed to any other device of the rotorcraft that makes use of the trim actuator, independently of the warning device.

In a preferred implementation of the method of the present invention, said at least one warning member comprises a shaker installed on the flight control member. Under such circumstances, the warning unit also collects a second said power margin supplied by the predictor unit taking the difference between said predicted power and a second said power limit.

The warning unit generates a command to activate the shaker under the combined conditions of the warning unit collecting both said second power margin and equally well position data and/or force data relating to a request to increase the lift to be supplied to the main rotor.

Generation by the warning unit of the command for activating the shaker is interrupted as a result of the warning unit identifying a value for the second power margin that is greater than a second predefined power threshold in compliance with the current regulation rating.

In an advantageous implementation of the method of the present invention, the command for anchoring the trim actuator is conditional on taking account of the intrinsic resistance of the main control linkage against being moved, by the warning unit comparing the first power margin and a third predefined power threshold.

Such provisions serve to limit untimely generation of said anchoring command in the event of said first power margin being transmitted to the warning unit without taking account of possible movements of the main control linkage that the pilot of the rotorcraft performs quickly in an emergency situation. This serves to improve the piloting comfort for the human pilot by avoiding sustained generation over a short duration of tactile signals generated by the warning unit.

Preferably, in like manner and in order to achieve the same result as that mentioned above, the command for activating the shaker issued by the warning unit is also conditional on taking account of the intrinsic resistance of the main control linkage against being moved, by the warning unit comparing the second power margin and a fourth predefined power threshold.

In a preferred implementation of the method of the present invention, said command data causing the anchoring of the trim actuator to be interrupted is a function of the following conditions in combination:

firstly force data that is less than or equal to a predefined force threshold, such force data and the predefined force threshold being negative algebraic values since they are oriented in the direction for reducing the lift to be supplied by the main rotor of the rotorcraft; and secondly position data indicative of the flight control member being moved by a human, in particular by identifying a variation in the position of the flight control member.

In a subsidiary implementation of the method of the present invention, the shaking generated by the shaker varies equally well in frequency and/or in amplitude depending on variation in the value of the second power margin.

Preferably, in order to avoid the human pilot being confused about the various urgency thresholds for acting on the flying behavior of the rotorcraft, the tactile signals respectively produced by the trim actuator and by the shaker are given such respective urgency thresholds for the human pilot acting on the flying behavior of the rotorcraft. More particularly, uses of the trim actuator and of the shaker are segregated in order to generate alternative tactile signals, with this depending on the respective regulation ratings of the power plant.

Specifically, the operation of the power plant is regulated in application of predefined regulation ratings including AEO ratings comprising an MTP rating, a TOP rating, an MCP rating, and also OEI ratings including a very short duration OEI rating, a short duration OEI rating, and a continuous OEI rating.

As mentioned above, such regulation ratings are typical and well known to the person skilled in the art of rotorcraft, in particular in compliance with the definition and the explanations given above.

For this purpose, the warning device makes use respectively of the trim actuator and of the shaker in selective manner depending on the current regulation rating of the power plant. Anchoring of the trim actuator and activation of the shaker are in particular implemented as follows:

the trim actuator is implemented for a current regulation rating of the power plant coming within the regulation ratings comprising the TOP rating, the MCP rating, the short duration OEI rating, and the continuous OEI rating; and the shaker is implemented for a current regulation rating of the power plant coming within the regulation ratings comprising the MPT rating and the very short duration OEI rating.

Furthermore, the respective values of at least one of the first power limit and the second power limit preferably vary depending on the forward speed of the rotorcraft. More particularly, the values of the first power limit and of the second power limit decrease from the rotorcraft advancing at low speeds to the rotorcraft advancing at high speeds in cruising flight.

More specifically, the value of the first power limit varies as follows:

at low forward speeds of the rotorcraft, in the TOP regulation rating and the short duration OEI regulation rating, the value of first power limit is constant;

at transitional forward speeds of the rotorcraft between low and high forward speeds of the rotorcraft, typically representative of the rotorcraft traveling in cruising flight, the value of the first power limit decreases on the AEO regulation rating of the power plant passing from the TOP rating to the MCP rating. The value of the first power limit is also digressive and as a result of the OEI regulation rating of the power plant passing from the short duration OEI rating to the continuous OEI rating; and at said high forward speeds of the rotorcraft, in the MCP regulation rating and in the long duration OEI regulation rating, the value of the first power limit is constant.

Still more specifically, the value of the second power limit varies as follows:

at low forward speeds of the rotorcraft, in the TOP regulation rating or in the very short duration OEI regulation rating, the value of the second power limit is constant;

at transitional forward speeds of the rotorcraft between low speeds and high forward speeds of the rotorcraft, the value of the second power limit decreases in the TOP regulation rating and is constant in the very short duration OEI regulation rating; and at high forward speeds of the rotorcraft, the value of the second power limit is constant in the TOP regulation rating and in the very short duration OEI regulation rating.

Preferably, said at least one power margin is calculated more particularly by the predictor unit as follows:

calculating the predicted power by summing the current power supplied by the power plant in application of the current regulation rating and a power request (which may equally well be positive or negative) to be supplied by the power plant calculated by the predictor unit on the basis of the command data; and calculating said at least one power margin by subtracting the predicted power from the power limit.

In a preferred implementation of the method of the present invention, activation of the motor of the trim actuator is regulated by the predictor unit acting iteratively at a given frequency to calculate an anchoring position command for the trim actuator as follows:

calculating a position margin relating to variation in the position of the flight control member that is acceptable relative to the first power margin. Said position margin is calculated by dividing the first power margin by a predefined constant, naturally predefined depending on the structure of the rotorcraft, identifying a power variation, which may potentially be positive or negative, for a given variation in the position of the flight control member; then deducing said anchor position command for the trim actuator by summing the previously calculated position margin and the current position of the flight control member as identified by the position data supplied by the position sensor; and generating an order to activate the motor of the trim actuator in compliance with the previously deduced command for positioning the anchoring of the trim actuator.

The order to activate the motor of the trim actuator as generated by the predictor unit identifies more particularly an anchoring position for the trim actuator and an operating speed for the trim actuator to be imparted by its motor.

The operating speed of the trim actuator is calculated in particular depending on the variation in the anchoring position of the trim actuator and depending on the current regulation rating of the power plant.

It should be observed that the trim actuator used by the method of the present invention may be an anchorable motorized trim actuator of active type or an anchorable motorized trim actuator of passive type, as defined above.

Nevertheless, it is preferred to use an anchorable motorized trim actuator of active type and to add provisions to the ways for the warning unit to anchor the trim actuator on the main control linkage for the purpose of improving piloting comfort for the human pilot of the rotorcraft when the warning unit interrupts its generation of the command for anchoring the trim actuator.

In order to improve the pertinence perceived by the human pilot of the tactile warnings that are generated, it is appropriate to interrupt variation in the resisting force that is opposed by the trim actuator under the control of the warning unit as soon as the human pilot takes action on the flight control member enabling the request for power to be supplied by the power plant to be reduced sufficiently to interrupt generation of the tactile signal produced by the trim actuator.

It should be recalled that said tactile signal relates to varying the resisting force opposed by the trim actuator against movement of the main control linkage under the effect of a human driving the flight control member, and that said resisting force opposed by the trim actuator is interrupted as a result of the warning unit interrupting the command for anchoring the trim actuator.

Nevertheless, under such circumstances, the pilot moving the flight control member runs the risk of being confronted with a sudden release of the main control linkage from the action exerted by the trim actuator, since its anchoring under the control of the warning unit is interrupted as a result of the human pilot moving the flight control member in such a manner as to reduce the request for power to be supplied by the power plant. It can thus be seen that it is necessary to find a solution under such circumstances to provide piloting comfort for the human pilot in an emergency situation. Such a solution must involve taking account of the possibility made available to the warning unit to generate tactile signals, including in circumstances when the pilot temporarily lets go of the flight control member in compliance with the above-mentioned ways provided for interrupting the generation of the anchoring command by the warning unit.

In this context, following interruption of the anchoring command being generated by the warning unit, it is preferably proposed to place the anchorable motorized trim actuator of active type in a friction configuration mode. In such a friction configuration mode, the trim actuator is conventionally kept anchored to the main control linkage while generating a resisting force, referred to as a "friction" force, of value that is greater than the absolute value of said force threshold.

For example, the trim actuator may be placed in a friction configuration mode by the autopilot that also has available the current anchoring position of the trim actuator, as mentioned above.

It should also be observed that the flight control member having said at least one warning member used in accordance with the method of the invention is potentially a flight control member giving rise to a variation in the pitch of the blades of the main rotor, and in particular a variation that may equally well be collective and/or cyclic.

Nevertheless, the warning member(s) is/are preferably installed as a priority on the flight control member dedicated to collective variation of the pitch of the blades of the main rotor, and in subsidiary manner also on a flight control member for cyclic variation of the pitch of the blades of the main rotor.

BRIEF DESCRIPTION OF THE SEVERAL VIEWS OF THE DRAWINGS

An implementation of the present invention is described with reference to the figures of the accompanying sheets, in which.

DETAILED DESCRIPTION OF THE INVENTION

Common members shown in the various figures are identified in the description corresponding to those figures with the same respective reference numbers and/or letters, without that implying they are individually shown in each of the figures.

Figure 1:
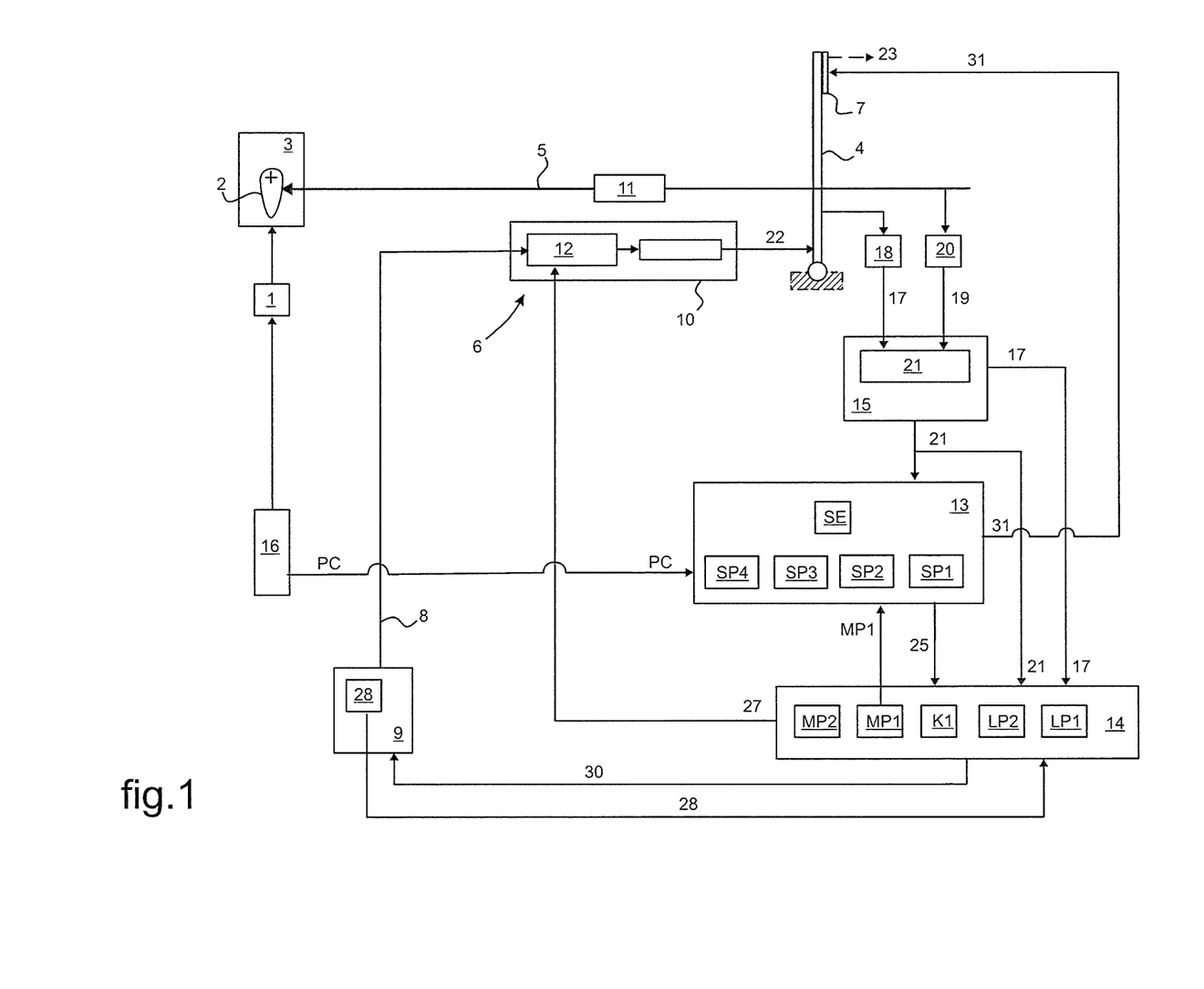
FIG. 1 is a diagram showing the general organization of a warning device forming part of a rotorcraft in accordance with the present invention.
Figure 5:
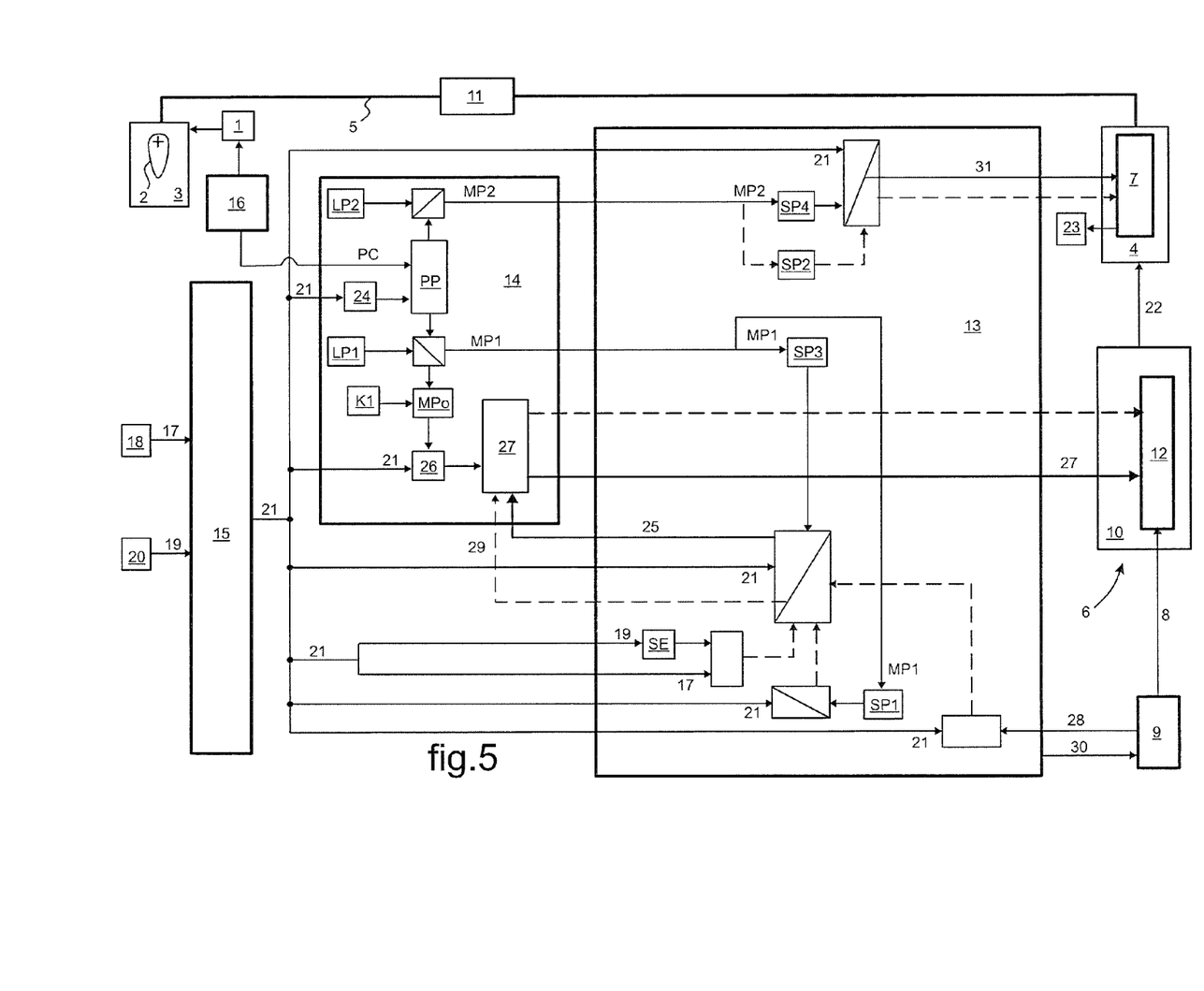
FIG. 5 is a block diagram showing specific ways of implementing the warning device shown in FIG. 1.

In FIGS. 1 and 5, a warning device for issuing warnings by means of tactile signals is arranged to inform a human pilot of a rotorcraft that a request for mechanical power to be supplied by a power plant 1 of the rotorcraft is potentially excessive. Said request for excessive power may potentially be caused as a result of the human pilot issuing a command to vary collectively and/or cyclically the pitch of the blades 2 of at least one main rotor 3 of the rotorcraft.

More particularly, the human pilot of the rotorcraft has flight control members 4 that are moved by a human in order to vary the pitch of the blades 2 of said at least one main rotor 3 cyclically or collectively via respective main control linkages 5 for mechanically transmitting movements.

In the embodiment shown, the flight control member 4 is dedicated to controlling collective pitch variation of the blades 2. It should nevertheless be understood that the method of the present invention is suitable for application by means of one or more warning members 6, 7 fitted on a priority basis to a flight control member 4 dedicated to controlling collective variation of the pitch of the blades 2 and fitted on a subsidiary basis preferably to a flight control member dedicated to controlling cyclic variation of the pitch of the blades 2.

Nevertheless, variation in the pitch of the blades 2 of the main rotor 3 caused as a result of the human pilot moving the flight control member 4 can lead to a request for the power plant 1 to supply power that is excessive given the current regulation rating of the power plant 1.

The current regulation rating of the power plant 1 is conventionally controlled by a regulator unit 16, being selected depending on current flying conditions of the rotorcraft from among a plurality of predefined AEO and OEI regulation ratings.

Furthermore, the rotorcraft has an auxiliary control linkage 8 involving an autopilot 9 generating flight control orders. The autopilot 9 acts on each of the attitude variation axes of the rotorcraft in pitching, in roll, vertically, and in yaw, firstly to stabilize the forward flight of the rotorcraft by applying basic modes of operation of the autopilot 9, and secondly to guide the rotorcraft in flight by applying higher modes of operation of the autopilot 9.

For a given main control linkage 5, e.g. dedicated to collective control of the blades 2 about their individual pitch variation axes, as in the embodiment shown, the flight control orders generated by the autopilot 9 selectively activate the use of drive members in the main control linkage that includes a trim actuator 10 and a series actuator 11 (FIG. 1).

Typically, and as shown in FIG. 1, the trim actuator 10 is connected in parallel with the main control linkage 5 while the series actuator 11 is connected in series with the main control linkage 5.

The trim actuator 10 is more particularly an anchorable motorized trim actuator that is capable of being declutched from the main control linkage 5 or conversely of being clutched to a desired anchor position on the main control linkage 5.

For this purpose, and in compliance with common ways of implementing an anchorable motorized trim actuator 10, the autopilot 9 generates firstly an anchoring command for anchoring the trim actuator 10 to the main control linkage 5 causing the clutch of the motor of the trim actuator 10 to be engaged, and secondly an anchor position command for the trim actuator 10 causing the speed and the position of the motor 12 of the trim actuator 10 to be used to anchor the trim actuator 10 to the main control linkage 5 at a given anchor position.

In this context, the warning device has at least one warning member 6 constituted by said trim actuator 10 and at least one warning member constituted by a shaker 7 implanted on the flight control member 4. Furthermore, the warning device uses the warning unit 13 by collecting data supplied by a predictor unit 14 and by a force management unit 15 in order to activate selectively use respectively of the trim actuator 10 and of the shaker 7 depending on the current regulation rating of the power plant 1 as identified by the regulator unit 16.

The force management unit 15 comprises calculation means identifying command data 21 relating to the flight control member 4 being moved by a human.

Said command data 21 comprises at least position data 17 supplied by a position sensor 18 and at least force data 19 supplied by a force measurement device 20, such as a device implementing a force link.

The position sensor 18 detects the current position of the flight control member 4 and generates said position data 17 that is transmitted to the force management unit 15. The force management unit 15 then calculates any variation in the position of the flight control member 4. The force management device 20 detects the resisting force opposed by the trim actuator 10 against a movement of the main control linkage 5 and transmits the force data 19 to the force management unit 15.

The force management unit 15 generates at least one item of command data 21 relating to a possible request for power to be supplied by the power plant 1 as a result of the flight control member 4 being moved by the human pilot of the rotorcraft. The command data 21 is supplied to the predictor unit 14 and to the warning unit 13 by the force management unit 15.

The predictor unit 14 operates iteratively at a given frequency to calculate at least one power margin MP1 and MP2 relating to the power available from the power plant 1 as evaluated by the difference between a predicted power PP and at least one power limit LP1 and LP2. More particularly, the predictor unit 14 calculates a first power margin MP1 associated with generating a first tactile signal 22 by producing a resisting force opposed by the trim actuator 10 against human movement of the flight control member 4.

The predictor unit 14 also calculates a second power margin MP2 associated with generating a second tactile signal 23 by causing the shaker 7 to shake.

The predicted power PP relates to the power that is to be supplied by the power plant 1 as a result of the human pilot of the rotorcraft moving the flight control member 4.

The predicted power PP is calculated by the predictor unit 14 by summing the current power PC supplied by the power plant in compliance with application of the current regulation rating and a power variation identified by the command data 21 generated by the force management unit 15 as a result of the flight control member 4 being moved by a human.

The power limits LP1 and LP2 relate to limits on the power to be supplied by the power plant 1 and they are predefined depending on the current regulation rating of the power plant 1 as identified by the regulator unit 16. Naturally, the power limits LP1 and LP2 associated respectively with operating the trim actuator 10 and the shaker 7 have different values.

Figure 2:
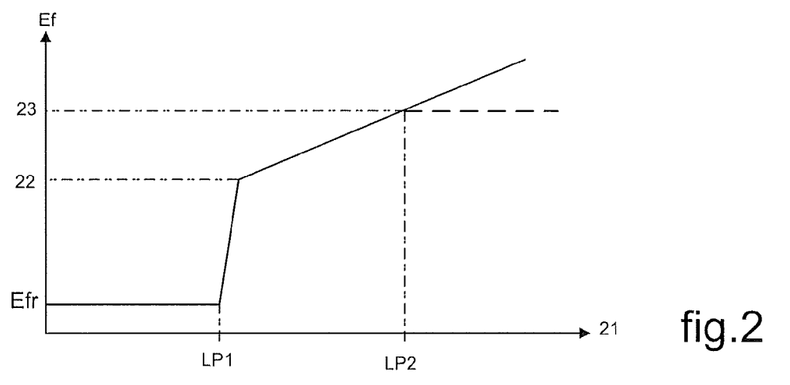
FIG. 2 is a diagram showing ways of implementing various warning members of the warning device shown in FIG. 1.

More particularly, FIG. 2 shows a template of forces Ef as a function of flight command data 21 generated by the force management unit 15 relative to the first power limit LP1 and relative to the second power limit LP2.

Figure 6:
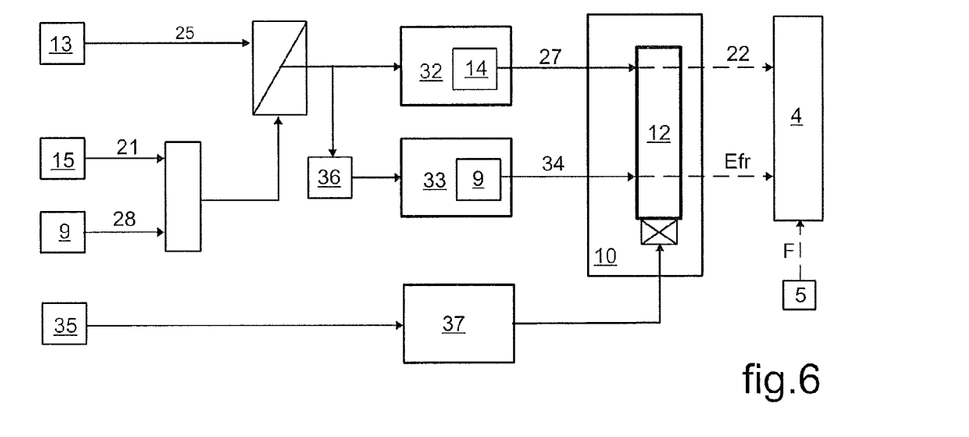
FIG. 6 is a block diagram showing various configurations of an anchorable motorized trim actuator of active type in a specific embodiment of the warning device shown in FIG. 1.
Figure 7:
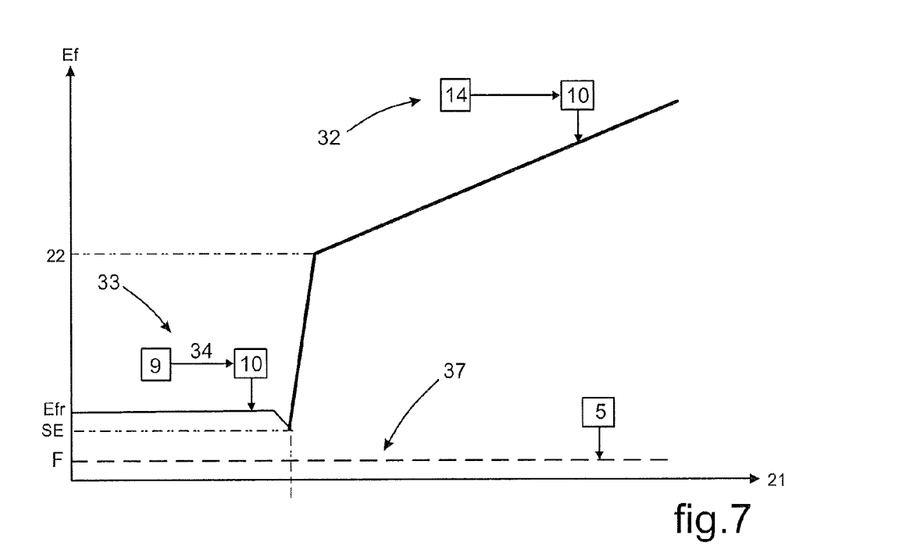
FIG. 7 is a diagram showing by way of example ways in which an opposing force generated by a trim actuator can vary in compliance with the various configurations shown in FIG. 6.

For command data 21 identifying a request for power below the first power limit LP1, the trim actuator 10 is configured in friction by being placed in a predefined anchor position to oppose a constant resistive force Efr, referred to as "friction" force, against the movement of the main control linkage 5, thereby improving the piloting comfort of the rotorcraft for the human pilot, in particular by applying provisions that are shown in FIGS. 6 and 7 and described below.

For command data 21 identifying a request for power greater than the first power limit LP1, the trim actuator 10 is used to generate the first tactile signal 22 by opposing increasing resistive force against the movement of the main control linkage 5.

For command data 21 identifying a power request greater than the second power limit LP2, the shaker 7 is used to generate the second tactile signal 23 by shaking.

It should be observed that the shaking generated by the shaker 7 may potentially be regulated by the warning unit 13 so that the shaking varies in frequency and in amplitude depending on variation in the request for power.

Figure 3:
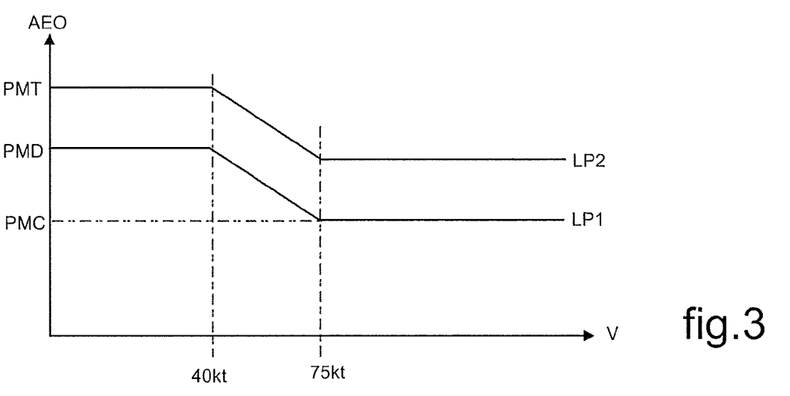
FIGS. 3 and 4 are diagrams showing ways of implementing various warning members of the warning device shown in FIG. 1, in different respective regulation ratings for a power plant of the rotorcraft.
Figure 4:
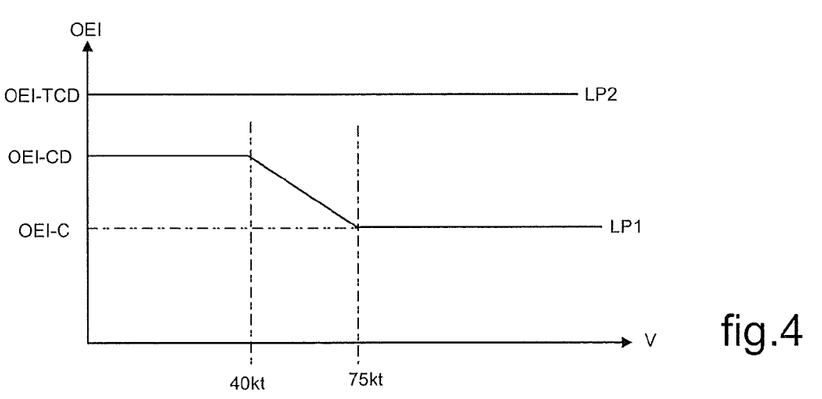

In addition, in FIGS. 3 and 4, the values of the first power limit LP1 and of the second power limit LP2 vary depending on the forward speed V of the rotorcraft.

In FIG. 3, for the AEO regulation rating, the respective values of the first power limit LP1 and of the second power limit LP2 are constant at low forward speeds V of the rotorcraft, and they decrease during transitional forward speeds V of the rotorcraft, being constant once more at high forward speeds V of the rotorcraft.

More particularly at transitional speeds, the value of the first power limit LP1 decreases between the TOP regulation rating and the MCP regulation rating for the power plant 1. The value of the second power limit LP2 decreases between low forward speeds and high forward speeds of the rotorcraft under the MTP regulation rating of the power plant 1.

In FIG. 4, under the OEI regulation rating of the power plant 1, the value of the first power limit LP1 is constant at low forward speeds V of the rotorcraft under a short duration OEI (SD-OEI) regulation rating, decreases for transitional forward speeds V of the rotorcraft, and is constant at high forward speeds V of the rotorcraft under the continuous OEI (C-OEI) regulation rating. The value of the second power limit LP2 is constant under the very short duration OEI (VSD-OEI) regulation rating, independently of the forward speed V of the rotorcraft.

The first power limit LP1 and the second power limit LP2 are taken into account when calculating the respective power margins MP1 and MP2 depending on the current regulation rating of the rotorcraft. These provisions enable the trim actuator 10 and the shaker 7 to be activated by the warning device selectively in isolation or in combination depending on the urgency for human pilot intervention in order to reduce the request for power being made by moving the flight control member 4.

This enables the human pilot to assess tactually the urgency of taking action on the flight control member 4 as a function of individually perceiving one or the other of the various tactile signals 22 and 23 as generated distinctly respectively by the trim actuator 10 and by the shaker 7 depending on the current regulation rating of the power plant 1. This serves to improve piloting comfort of the rotorcraft for the human pilot.

More particularly in FIG. 5, the warning unit 13 activates use respectively of the trim actuator 10 and of the shaker 7 depending on the flight commands issued by the pilot using the flight control member 4 and depending on the power margins MP1 and MP2 as identified by the predictor unit 14.

More particularly, the predicted power PP is calculated by the predictor unit 14 by summing the current power PP of the power plant 1 in compliance with the current regulation rating and the power request as generated by the human pilot moving the flight control member 4. Said power request is calculated by the predictor unit 14 on the basis of the command data 21 including in particular the position data 17 from which the warning unit 13 deduces variation in the position 24 of the flight control member 4.

The first power margin MP1 is then deduced by the predictor unit 14 by taking the difference between the predicted power PP and the first power limit LP1. As a result the first power margin MP1 is transmitted to the warning unit 13 which then generates, where necessary, a command 25 for anchoring the trim actuator on the main control linkage 5.

The warning unit 13 generates the anchoring command 25 under the combined conditions:

of the warning unit 13 receiving command data 21 including in particular the position data 17 identifying a flight command that will lead to an increase in the amount of power to be supplied by the power plant 1; and of the warning unit 13 receiving said first power margin MP1, preferably taken into account by the warning unit 13 after deducing by comparison a value of the first power margin that is less than a third predefined power threshold SP3.

The predictor unit 14 then regulates activation of the motor 12 of the trim actuator 10 and consequently the anchor position 26 of the trim actuator on the main control linkage 5.

The anchor position 26 of the trim actuator is deduced by the predictor unit 14 by calculating a position margin MPo relative to variation in the position of the flight control member as deduced from the command data 21 including in particular the position data 7. The position margin MPo is calculated by dividing the first power margin MP1 by a predefined constant K1 identifying variation of power for a given variation in the position of the control member.

Thereafter, the predictor unit 14 deduces the anchor position 26 of the trim actuator 10 by summing the previously calculated position margin MPo and the current position of the flight control member 4 as identified by the control data 21 and more specifically by the position data 17.

The predictor unit 14 then generates an order 27 to activate the motor 12 of the trim actuator 10, which order identifies the anchor position 26 of the trim actuator 10 and a speed at which the trim actuator 10 is to be moved by the motor 12 of the actuator in order to place the trim actuator in the required anchor position 26.

Furthermore, the generation of the anchor command 25 for the trim actuator by the warning unit 13 may potentially be interrupted, or by analogy may be prohibited, in the event of the warning unit 13 receiving state data 28 relating to an activation state of the autopilot 9 in at least one higher operating mode for regulating collective variation of the pitch of the blades 2 of the main rotor 3.

Prohibiting generation of the anchor command 25 in this way also depends on the warning unit 13 detecting command data 21 indicating that the flight control member 4 is not being moved by a human.

Under such circumstances, the warning unit then generates a command 29 to interrupt anchoring of the trim actuator 10 by the warning unit on the main control linkage 5. After interrupting anchoring of the trim actuator on the main control linkage 5, anchor position data 30 is transmitted to the autopilot 9.

In addition, such a command 29 for causing the warning unit on the main control linkage 5 to interrupt anchoring of the trim actuator 10 may potentially be generated as a result of the warning unit 13 detecting a request to reduce the lift that the main rotor 3 is to supply, which request is made by a human moving the flight control member 4. Such a request to reduce lift may be detected in particular by the warning unit 13 receiving command data 21 identifying force data 19 that is less than or equal to a force threshold SE, the force data 19 and the force threshold SE both having negative algebraic values since they represent a force in the direction for reducing the lift to be provided by the main rotor 3 of the rotorcraft and identifying position data 17 indicating that the flight control member 4 is being moved by a human.

Furthermore, in the preferred implementation shown, the warning unit 13 compares the value of the first power margin MP1 with a first power threshold SP1 defined in compliance with the current regulation rating.

Generation by the warning unit 13 of the command 25 for anchoring the trim actuator 10 may be interrupted firstly in the event of the force management unit 15 detecting that the flight control member 4 is not being moved by a human and secondly as a result of the warning unit 13 identifying a value for the first power margin MP1 that is greater than the first power threshold SP1. Under such circumstances, account is taken specifically of a prohibition on driving the flight control member 4 using the trim actuator 10 in order to increase the lift to be supplied by the main rotor 3.

In addition, the warning unit 13 generates a command 31 for activating the shaker in order to generate the second tactile signal 23 under the following conditions in combination:

the warning unit 13 receiving the second power margin MP2, preferably as taken into account by the warning unit 13 after deducing by comparison a value of the second power margin that is less than a fourth predefined power threshold SP4; and command data 21 relating to a request to increase the lift to be supplied by the main rotor 3, incorporating equally well position data 17 and/or force data 19.

Generation by the warning unit 13 of the command 31 for activating the shaker may be interrupted as a result of the warning unit 13 identifying a value for the second power margin MP2 that is greater than a second power threshold SP2.

In FIGS. 6 and 7, the trim actuator 10 is more particularly a motorized trim actuator with active type anchoring.

As mentioned above with reference to FIGS. 1 and 5 in particular, the first tactile signal 22 is generated by activating the motor 12 of the trim actuator 10 in compliance with the activation order 27 generated by the predictor unit 14. Under such circumstances, the use of the trim actuator 10 depends on a warning configuration mode 32 in which the trim actuator 10 generates the first warning signal 22 by opposing a resisting force against the movement of the main control linkage 5, said resisting force varying depending on the activation order 27 generated by the predictor unit 14.

Still as mentioned above, with reference to FIGS. 1 and 5 in particular, an interruption of the anchoring command 25 as generated by the warning unit 13 causes the trim actuator 10 to stop generating the first warning signal 22, independent firstly on state data 28 relating to activation of at least a higher mode of operation of the autopilot 9 along at least one travel axis including at least the gravity axis, and secondly of command data 21 relating to position data 17 identifying that the flight control member 4 is not being moved by a human.

Furthermore, as shown in FIG. 6, regardless of whether the trim actuator is passive or active, the combination between firstly state data 28 relating to activation of at least one higher operating mode of the autopilot 9 along at least one travel axis including at least the gravity axis, and secondly command data 21 relating to position data 17 indicating that the flight control member 4 is not being driven by a human enables the predictor unit 14 to generate an order 27 for activating the motor of the trim actuator.

Since generation of the anchoring command 25 is interrupted in combination with deactivating the autopilot 9 in at least one travel direction including at least the gravity axis, it is proposed to make use of the trim actuator 10 dependent on a friction configuration mode 33 whereby the autopilot 9 generates a command 34 for friction anchoring the trim actuator. By way of example, the friction anchoring command 34 may be generated by means of a data inverter 36 on the basis of the anchoring command 25 generated by the warning unit 13.

In said friction configuration mode 33, the trim actuator 10 is held anchored to the main control linkage 5 in a predefined anchor position, such that the trim actuator opposes a preferably constant resisting force against movement of the main control linkage 5 under action by a human on the flight control member 4. In the friction configuration mode 33, the trim actuator produces a resisting force Efr referred to as a "friction" force, of value that is constant, being a value that is greater than or equal to the absolute value of said predefined force threshold SE used by the warning unit 13 to interrupt generation of the anchoring command 25.

Furthermore, the human pilot commonly has control means 35 commonly referred to as "trim release" means, enabling the pilot to declutch the trim actuator from its engagement exerted on the main control linkage 5. When the trim actuator is made to depend on a declutched configuration mode 37, anchoring of the trim actuator on the main control linkage 5 is inhibited.

In the declutched configuration mode 37, the human pilot can operate the flight control member 4 by overcoming the friction forces F that are specific to the flight control linkage 5.

What is claimed is:

1. A method of implementing a tactile signal warning device fitted to a human-operated flight control member of a rotorcraft, the flight control member forming part of a main control linkage for varying the pitch of blades of at least one main rotor of the rotorcraft having a drive axis that is substantially vertical and providing the rotorcraft essentially with its lift, the rotorcraft being provided with:
   a power plant providing mechanical power used at least for driving rotation of the main rotor, at least one auxiliary control linkage including an autopilot for generating flight control orders controlling the use of at least one anchorable motorized trim actuator arranged in parallel with the main control linkage; and
   a predictor unit that operates iteratively at a given frequency to calculate at least one power margin (MP1, MP2) relating to the power available from the power plant by taking the difference between a predicted power (PP) and a power limit (LP1, LP2) relating to power to be supplied by the power plant as predefined in application of a current regulation rating of the power plant,
   wherein the warning device comprises a first calculation member, referred to as a "warning unit", a second calculation member formed by the predictor unit, a third calculation member, referred to as a "force management" unit, and at least one warning member for generating a tactile sensation perceptible by the human pilot by means of the flight control member, the at least one warning member comprising at least the trim actuator opposing a resisting force against the flight control member being moved by a human, such that:
   the force management unit generates command data relating to a human-originating request for lift to be supplied by the main rotor, the command data being a function of at least one item of data selected from the group comprising:
      position data supplied to the force management unit by a position sensor measuring a current position of the flight control member; and
      force data supplied to the force management unit by a force measurement device engaged with the main control linkage, the force data being representative of forces for moving the main control linkage under the effect of a human acting on the flight control member;
   the predictor unit calculating the predicted power (PP) by summing a current power (PC) of the power plant and a variation in the power to be supplied by the power plant as requested by a human acting on the flight control member and as deduced by the predictor unit from command data that is a function of at least one of the position data and the force data; and
   the warning unit collects at least one of the following items of data selected from the group comprising:
      the command data as a function of at least one of the position data supplied by the position sensor and the force data supplied by the force measurement device;
      at least a first said power margin (MP1) supplied by the predictor unit by taking the difference between the predicted power (PP) and a first said power limit (LP1); and
      state data relating to activation of at least any higher operating mode of the autopilot causing the main control linkage to be used to guide the rotorcraft along at least one travel axis including at least the gravity axis;
   wherein the warning unit generates an anchoring command for anchoring the trim actuator on the main control linkage, the anchoring command being generated on condition both of said first power margin (MP1) and of said command data that is a function of position data and/or of force data relating to a request to increase the lift to be supplied by the main rotor;
   wherein, as a result of the warning unit generating the command for anchoring the trim actuator, the predictor unit regulates activation of the motor of the trim actuator and consequently activates an anchoring command of the trim actuator on the main control linkage so as to vary the resisting force opposed by the trim actuator against human action on the flight control member; and
   wherein the warning unit ceases to generate the command for anchoring the trim actuator when the force management unit generates command data representative of a human request to reduce the lift to be supplied by the main rotor, the human exerting a drive force on the flight control member that opposes a resisting force of the trim actuator.

2. A method according to claim 1, wherein:
the method further comprises an operation of the warning unit comparing the value of the first margin (MP1) and a first power threshold (SP1) defined in compliance with the current regulation rating; and
the warning unit ceases to generate the command for anchoring the trim actuator when the following conditions are satisfied:

the force management unit generates command data relating to position data identifying that the flight control member is not being operated by a human; and the warning unit identifies a value for the first power margin (MP1) that is greater than or equal to the first power threshold (SP1).

3. A method according to claim 1, wherein the predictor unit regulates the activation of the motor of the trim actuator as a function of variation in the value equally well of the position data and/or of the force data.

4. A method according to claim 1, wherein the predictor unit regulates the activation of the motor of the trim actuator as a function of variation in the first power margin (MP1).

5. A method according to claim 1, wherein as a result of the warning unit generating the anchoring command, anchoring data relating to the current anchoring position of the trim actuator on the main control linkage is supplied by the warning unit at least to the autopilot.

6. A method according to claim 1, wherein the at least one warning member comprises a shaker installed on the flight control member, the warning unit also collects a second said power margin (MP2) supplied by the predictor unit by taking the difference between said predicted power (PP) and a second said power limit (LP2);

the warning unit generates a command to activate the shaker under the combined conditions of the warning unit collecting both the second power margin (MP2) and equally well position data and/or force data relating to a request to increase the lift to be supplied to the main rotor, and generation by the warning unit of the command for activating the shaker is interrupted as a result of the warning unit identifying a value for the second power margin (MP2) that is greater than a second predefined power threshold (SP2) in compliance with the current regulation rating.

7. A method according to claim 1, wherein the command for anchoring the trim actuator is conditional on taking account of the intrinsic resistance of the main control linkage against being moved, by the warning unit comparing the first power margin (MP1) and a third predefined power threshold (SP3).

8. A method according to claim 6, wherein the command for activating the shaker issued by the warning unit is also conditional on taking account of the intrinsic resistance of the main control linkage against being moved, by the warning unit comparing the second power margin (MP2) and a fourth predefined power threshold (SP4).

9. A method according to claim 1, wherein the command data causing anchoring of the trim actuator to be interrupted is deduced from combined conditions comprising firstly force data less than or equal to a predefined force threshold (SE) and secondly position data identifying that the flight control member is being moved by a human.

10. A method according to claim 6, wherein the shaking generated by the shaker varies equally well in frequency and/or in amplitude depending on variation in the value of the second power margin (MP2).

11. A method according claim 6, wherein the operation of the power plant is regulated in application of predefined regulation ratings including AEO ratings comprising an MTP rating, a TOP rating, an MCP rating, and also OEI ratings including a very short duration OEI rating, a short duration OEI rating, and a continuous OEI rating; and the warning device makes use respectively of the trim actuator and of the shaker in selective manner depending on the current regulation rating of the power plant, anchoring of the trim actuator and activation of the shaker being implemented as follows:

the trim actuator is implemented for a current regulation rating of the power plant coming within the regulation ratings comprising the TOP rating, the MCP rating, the short duration OEI rating, and the continuous OEI rating; and the shaker is implemented for a current regulation rating of the power plant coming within the regulation ratings comprising the MPT rating and the very short duration OEI rating.

12. A method according to claim 6, wherein the respective values of at least one of the first power limit (LP1) and of the second power limit (LP2) vary depending on the forward speed of the rotorcraft, the values of the first power limit (LP1) and of the second power limit (LP2) decreasing from the rotorcraft advancing at low speeds to the rotorcraft advancing at high speeds in cruising flight.

13. A method according to claim 11, wherein the respective values of at least one of the first power limit (LP1) and of the second power limit (LP2) vary depending on the forward speed of the rotorcraft, the values of the first power limit (LP1) and of the second power limit (LP2) decreasing from the rotorcraft advancing at low speeds to the rotorcraft advancing at high speeds in cruising flight and wherein the value of the first power limit (LP1) varies as follows:

at low forward speeds of the rotorcraft, in the TOP regulation rating and the short duration OEI regulation rating, the value of first power limit (LP1) is constant;

at transitional forward speeds of the rotorcraft between low and high forward speeds of the rotorcraft, the value of the first power limit (LP1) decreases on the AEO regulation rating of the power plant (1) passing from the TOP rating to the MCP rating and as a result of the OEI regulation rating of the power plant (1) passing from the short duration OEI rating to the continuous OEI rating; and at high forward speeds of the rotorcraft, in the MCP regulation rating and in the long duration OEI regulation rating, the value of the first power limit (LP1) is constant.

14. A method according to claim 11, wherein the respective values of at least one of the first power limit (LP1) and of the second power limit (LP2) vary depending on the forward speed of the rotorcraft, the values of the first power limit (LP1) and of the second power limit (LP2) decreasing from the rotorcraft advancing at low speeds to the rotorcraft advancing at high speeds in cruising flight and wherein the value of the second power limit (LP2) varies as follows:

at low forward speeds of the rotorcraft, in the TOP regulation rating and in the very short duration OEI regulation rating, the value of the second power limit (LP2) is constant;

at transitional forward speeds of the rotorcraft between low and high forward speeds of the rotorcraft, the value of the second power limit (LP2) decreases in the TOP regulation rating and is constant in the very short duration OEI regulation rating; and at high forward speeds of the rotorcraft, the value of the second power limit (LP2) is constant in the TOP regulation rating and in the very short duration OEI regulation rating.

15. A method according to claim 1, wherein the at least one power margin (MP1, MP2) is calculated more particularly by the predictor unit as follows:

calculating the predicted power (PP) by summing the current power (PC) supplied by the power plant in application of the current regulation rating and a request for power to be supplied by the power plant calculated by the predictor unit on the basis of the command data; and calculating the at least one power margin (MP1, MP2) by subtracting the predicted power (PP) from the power limit (LP1, LP2).

16. A method according to claim 1, wherein activation of the motor of the trim actuator is regulated by the predictor unit acting iteratively at a given frequency to calculate an anchoring position command for the trim actuator as follows:

calculating a position margin (MPo) relating to variation in the position of the flight control member that is acceptable relative to the first power margin (MP1), the position margin (MPo) being calculated by dividing the first power margin (MP1) by a predefined constant (K1) identifying a power variation for a given variation in the position of the flight control member; then deducing the anchor position command for the trim actuator by summing the previously calculated position margin (MPo) and the current position of the flight control member as identified by the position data supplied by the position sensor; and generating an order to activate the motor of the trim actuator in compliance with the previously deduced command for positioning the anchoring of the trim actuator.

17. A method according to claim 16, wherein the order for activating the motor of the trim actuator as generated by the predictor unit identifies an anchoring position for the trim actuator and a speed at which the trim actuator is to be driven by its motor as calculated depending on the variation in the anchoring position of the trim actuator and depending on the current regulation rating of the power plant.

18. A method according to claim 1, wherein the trim actuator used by the method is an anchorable motorized trim actuator of active type.

19. A method according to claim 18, wherein following interruption of the anchoring command being generated by the warning unit, the trim actuator is placed in a friction configuration mode in which the trim actuator is held anchored to the main control linkage by generating a resisting force (Efr), referred to as a "friction" force, of constant value that is greater than or equal to the absolute value of the force threshold (SE).

20. A method according to claim 1, wherein the flight control member having said at least one warning member used in accordance with the method is a flight control member for generating a variation in the pitch of the blades of the main rotor.

* * * * *